United States Patent
Patil et al.

(10) Patent No.: US 8,004,277 B2
(45) Date of Patent: Aug. 23, 2011

(54) ROTARY POSITION SENSING APPARATUS

(75) Inventors: Swapnil G. Patil, Thane (IN); Gautham Ramamurthy, Bangalore (IN); Nurul H. Ibrahim, Boninayakanur (IN); Azhagar Raj, Vilathikulam (IN)

(73) Assignee: Honeywell International Inc., Morristown, NJ (US)

( * ) Notice: Subject to any disclaimer, the term of this patent is extended or adjusted under 35 U.S.C. 154(b) by 297 days.

(21) Appl. No.: 12/346,512

(22) Filed: Dec. 30, 2008

(65) Prior Publication Data

US 2010/0163333 A1 Jul. 1, 2010

(51) Int. Cl.
*G01B 7/30* (2006.01)

(52) U.S. Cl. .................................. 324/207.25

(58) Field of Classification Search .................. 324/160, 324/173, 174, 178, 179, 207.13, 207.24–207.26, 324/207.21, 207.2, 251, 261–262; 73/493, 73/514.39, 866.5; 335/296–306; 310/68 B
See application file for complete search history.

(56) References Cited

U.S. PATENT DOCUMENTS

| | | | |
|---|---|---|---|
| 4,841,246 A | 6/1989 | Juds et al. | |
| 4,914,389 A | 4/1990 | Juds | |
| 6,201,388 B1 | 3/2001 | Pecheny et al. | |
| 6,246,232 B1 | 6/2001 | Okumura | |
| 6,400,142 B1 | 6/2002 | Schroeder | |
| 6,411,082 B2 | 6/2002 | Glasson | |
| 6,492,807 B2 | 12/2002 | Spellman | |
| 6,496,003 B1 * | 12/2002 | Okumura et al. | 324/207.24 |
| 6,894,487 B2 * | 5/2005 | Kunz-Vizenetz | 324/207.25 |
| 7,017,274 B2 | 3/2006 | Stobbe | |
| 7,159,688 B2 | 1/2007 | Onizuka et al. | |
| 7,589,522 B2 * | 9/2009 | Knecht et al. | 324/207.21 |

OTHER PUBLICATIONS

Delphi, "Delphi Non-contact Multi-turn Rotary Position Sensor." Delphi Corporation. 2008.

* cited by examiner

*Primary Examiner* — Huy Phan
*Assistant Examiner* — Trung Q Nguyen
(74) *Attorney, Agent, or Firm* — Shumaker & Sieffert, P.A.

(57) ABSTRACT

An angular position sensor (100) for determining angular position includes a shaft (105) having a threaded portion (108), and a structure for engaging an external application (119). The shaft (105) includes a first permanent magnet (114). A nut (116) is threaded on the threaded portion (108). The nut (116) is formed from a first magnetic permeable material or includes a second permanent magnet (118). At least one constraint (122) is coupled to the nut (116) for preventing rotational movement of the nut (116) while allowing linear motion of the nut (116). A first magnetic sensor (120) is positioned along a length of the threaded portion (108) of the nut (116) for measuring a linear position of the nut (116). A second magnetic sensor (124) is provided for measuring an angular position of the shaft (105). Signal processing circuitry (130) is coupled to receive outputs from both the first magnetic sensor (120) and second magnetic sensor (124) for calculating a parameter relating to an angular position of the rotatable member.

15 Claims, 7 Drawing Sheets

ROTARY POSITION SENSING APPARATUS

FIELD OF THE INVENTION

The present invention relates to rotary position sensing apparatus, and in particular to rotary position sensing apparatus that can sense angles in excess of 360 degrees.

BACKGROUND

The application of electronics in automobile mechanical systems for better performance is increasing the percentage of electronics parts in an automobile system day by day. Demand for accurate, reliable and non-contact sensors which are essential parts of electronic control is also increasing. For example, rotary position sensors are sensors used for sensing the rotational position of the shafts, axles or columns such as steering columns. The output from rotary position sensors comprises rotation position. Rotation position refers to the orientation of the shaft and the number of turns the shaft is rotated from the beginning of the reference position.

Rotary position sensors are used as steering wheel sensors. A steering wheel sensor provides the value of the angular position of a steering column of a vehicle. Use of this measured angle can be used, for example, in electrical power steering (EPS), active steering, advanced front lighting systems, lane departure warning systems, 4-wheel steering, and active suspension. EPS improves safety, generally make steering hydraulics obsolete, can cut fuel consumption by as much as 0.41/100 km, and reduce development time and assembly cost.

There are different available apparatus and related methods for measuring the steering wheel angle including a potentiometer, optical encoder, Hall-effect and anisotropic magnetoresistive (AMR) sensor. The potentiometer is simplest method and is very low cost solution for the measurement of steering wheel angle. However, potentiometers generally have very short lives because of sliding contacts which tend to wear out after prolonged use. Optical encoding is a contactless method used in steering wheel angle measurement but requires a counter or register for measurement of angle because it can measure only 360° at a time and the next rotation it is added to the last value using the counter or rotation register. Optical encoding has several disadvantages including reliability problems due to dust or mud which can easily damage the optical sensor.

Hall-effect and related AMR sensing represents another method. A large number of sensors elements are required, together with the necessity for the magnet to be aligned with Hall IC. These methods generally require a step-down gear mechanism for angle requirements more than 360° which will affect the resolution of sensor also introduce accuracy error and hysteresis due to backlash and wear and tear.

In view of the shortcomings of known rotary position sensors described above, there is a need for a sensor that reliably provides a linear output over a sensing range more than 360 degrees. Such a sensor would include a memory which is independent of power, and be self-error compensating for wear and tear which can happen over time during service life of the sensor.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims.

Embodiments of the present invention describe rotary position sensing apparatus that are based on the lead screw principle. An angular position sensor for determining angular position comprises a shaft having a threaded portion, and a structure for engaging an external application. The external application involves rotation of a rotatable member. When the external application is engaged, the rotation of the rotatable member rotates the shaft. The shaft includes a first permanent magnet. The first permanent magnet is generally aligned to have its poles oriented along an axial direction of the shaft. A nut is threaded on the threaded portion. The nut is formed from a first magnetic permeable material or comprises a second permanent magnet. At least one constraint, such as a guide bar, is coupled to the nut for preventing rotational movement of the nut while allowing linear motion of the nut.

A first magnetic sensor is positioned along a length of the threaded portion of the nut for measuring a linear position of the nut. A second magnetic sensor is provided for measuring an angular position of the shaft. The second magnetic sensor is generally positioned in an axial direction of the shaft. Signal processing circuitry is coupled to receive outputs from the first magnetic sensor and the second magnetic sensor for calculating a parameter relating to an angular position of the rotatable member.

DETAILED DESCRIPTION

Figure 1A:
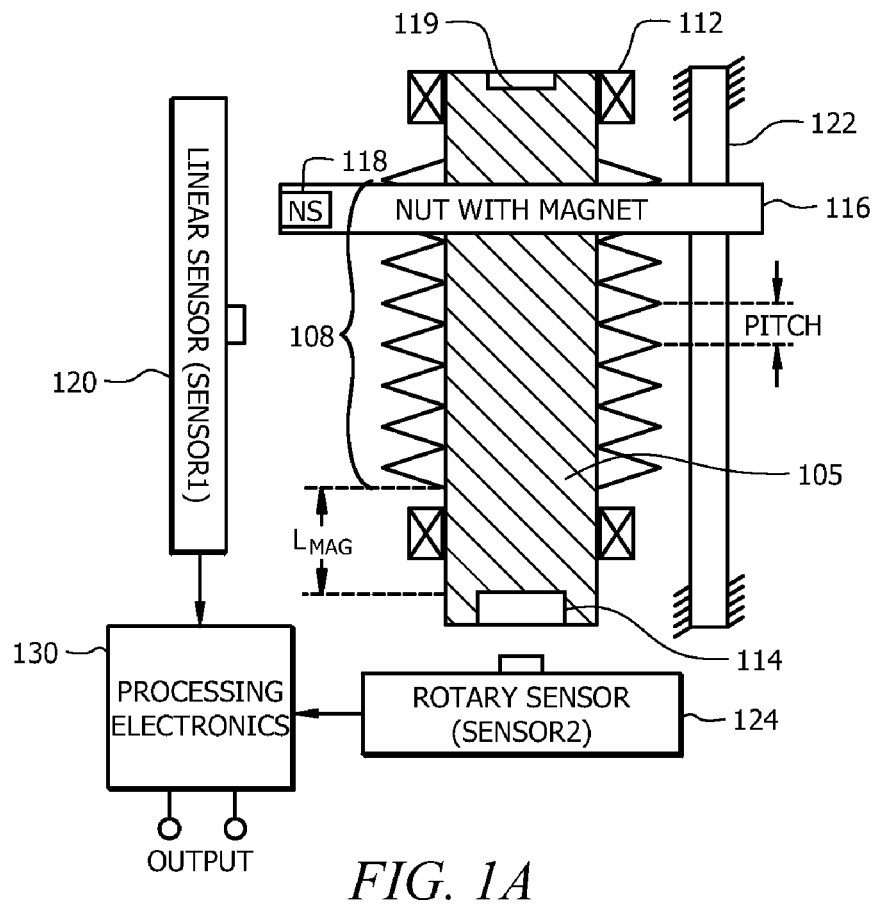
FIG. 1A is a front view depiction of an angular position sensor according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

FIG. 1A is a front view depiction of an angular position sensor 100 for determining angular positions more than 360 degrees according to an embodiment of the invention. Angular position sensor 100 is based on the lead screw principle and as described below provides a non-volatile magnetic mechanical memory for retaining the number of turns without the need for electrical power (e.g. from a power supply) to retain this information. Angular position sensor 100 comprises a shaft 105 having a threaded (e.g. screw) portion 108. Position sensor 100 includes bearings/support 112 positioned around shaft 105 which restricts motion of the shaft 105 to allow only rotational movement. Position sensor 100 includes a structure for engaging an external application 119 shown in FIG. 1A as a slot or groove. The external application generally involves rotation of a rotatable member, such as a steering wheel column. In operation, when the external application is engaged, the rotation of the rotatable member rotates the shaft 105. The shaft 105 includes a first permanent magnet 114. The first permanent magnet 114 can be aligned to have its poles oriented along an axial (length) direction of the shaft 105. A nut 116 is threaded on the threaded portion 108. The nut 116 is formed from a first magnetic permeable material or comprises a second permanent magnet. FIG. 1A shows the nut 116 comprising a second permanent magnet 118. At least one constraint 122, such as the guide rod/bar 122 shown in FIG. 1A, is coupled to the nut 116 for preventing rotational movement of the nut 116 while allowing linear motion of the nut.

The nut 116 is engaged in the threaded portion 108 through the guide rod 122. The threaded portion 108 has a threading pitch which defines the vertical translation length of nut 118 upon a 360 degree rotation of shaft 105. When the shaft 105 and thus threaded portion 108 rotates one turn (either clockwise(cw)/counterclockwise(ccw)), the nut 116 will move up or down a distance equal to its threading pitch. When threaded portion 108 rotates, due to the frictional force between nut 116 and the threaded portion 108, absent any constraint such as constraint shown as guide bar 122, the nut 116 would also tend to rotate instead of moving up or down. However, the guide bar 122 as known in lead screw arrangements solves this problem by constraining the movement of the nut 116 in the rotational direction and thus allows only up or down (linear) motion of nut 116.

A first magnetic sensor 120 is positioned along a length of the threaded portion 108 of the nut 116 for measuring a linear position of the nut 116 based on the linear position of its associated second permanent magnet 118. A second magnetic sensor 124 is provided for measuring an angular position of the shaft 105. For example, the respective magnetic sensors 120 and 124 can be independently selected from Hall-effect sensing elements or AMR sensing elements. The AMR sensing element can comprise a giant magneto-resistive (GMR) sensing element. AMR sensing elements are generally more sensitive sensing elements as compared to Hall-effect sensing elements. Other sensing technologies or combinations of technologies can be used to measure the angle and linear position of the nut 116 (turn count) other than Hall effect, AMR and GMR. For example, combinations can include a linear variable differential transformers (LVDT) and rotary variable differential transformer (RVDT), two potentiometers together, one Hall sensor and one potentiometer, and an AMR sensor and a Hall sensor.

The first magnetic sensor 120 is generally fixed in a location along the length of the threaded portion 108. As described above, as the threaded portion 108 is rotated by rotation of the shaft 105, due to mechanical constraints imposed by guide bar 122, the nut 116 moves up or down depending upon the direction of rotation of threaded portion 108. The movement of the magnet 118 (up or down) causes a change in magnetic field/flux at the location of first magnetic sensor 120. As described below, the turn count can be easily determined from reading provided by first magnetic sensor 120.

The second magnetic sensor 124 is generally positioned along an axial direction of the shaft 105. FIG. 1A shows a distance shown as "Lmag". Lmag is the shortest (minimum) distance between permanent magnets 114 and 118 to avoid interference between the two magnets. For position sensor 100 to maintain Lmag to at least a minimum predetermined value, the length of the shaft 105 is generally increased, which tends to increase the overall size of the position sensor 100.

Magnetic sensor 124 positioned under rotating shaft 105 provides a signal that represents an angle output up to 360° in each turn when the shaft 105 rotates. The magnet 114 attached to end of shaft 105 will be rotated in an amount equal to that of the rotation of the shaft 105. This change in angular position of magnet 114 will alter the magnetic field/flux at the second magnetic sensor 124, such as an AMR or a Hall-based sensing element.

Figure 4:
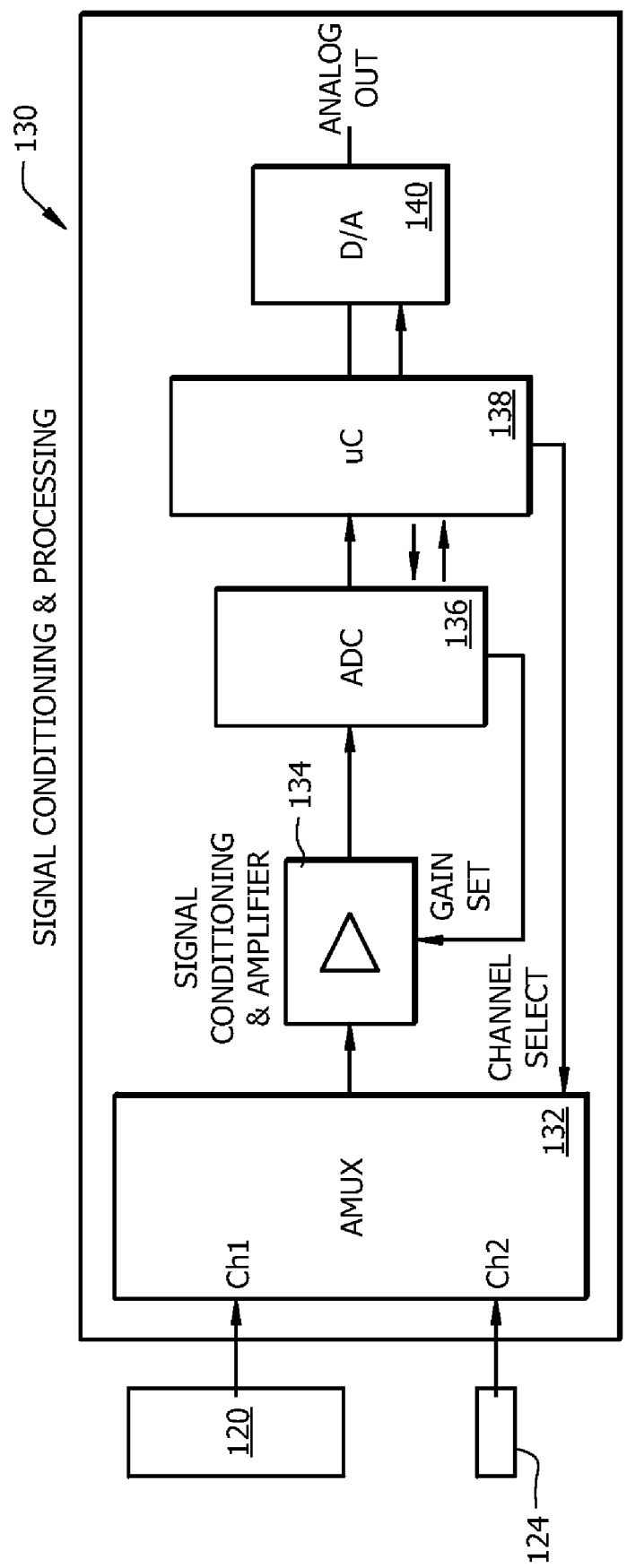
FIG. 4 shows a block diagram schematic for exemplary signal conditioning and electronic processing circuitry, according to an embodiment of the invention.

Processing electronics 130 is shown coupled to receive outputs from the first magnetic sensor 120 and the second magnetic sensor 124 and is operable for calculating the angular position or a parameter relating to an angular position of the rotatable member. FIG. 4 described below shows a block diagram for exemplary processing electronics 130.

Figure 1B:
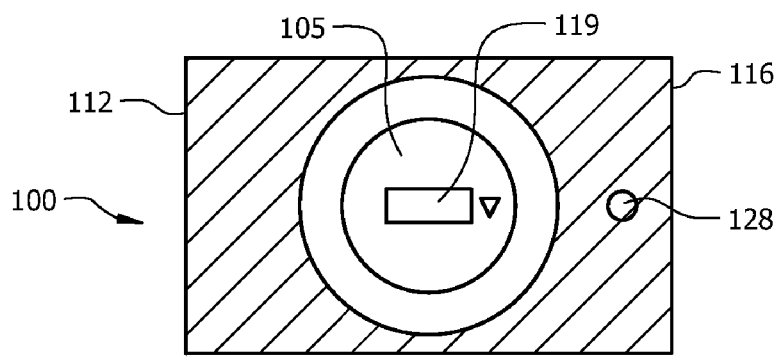
FIG. 1B is a top view depiction of an angular position sensor according to an embodiment of the invention.

FIG. 1B is a top view depiction of an angular position sensor 100 according to an embodiment of the invention. The top view provided reveals an aperture 128 that allows guide bar 122 to pass through nut 116 and thus constrain its rotational motion, while allowing linear motion (up and down). A plurality of apertures 128 (e.g. two (2)) are generally used.

Figure 2:
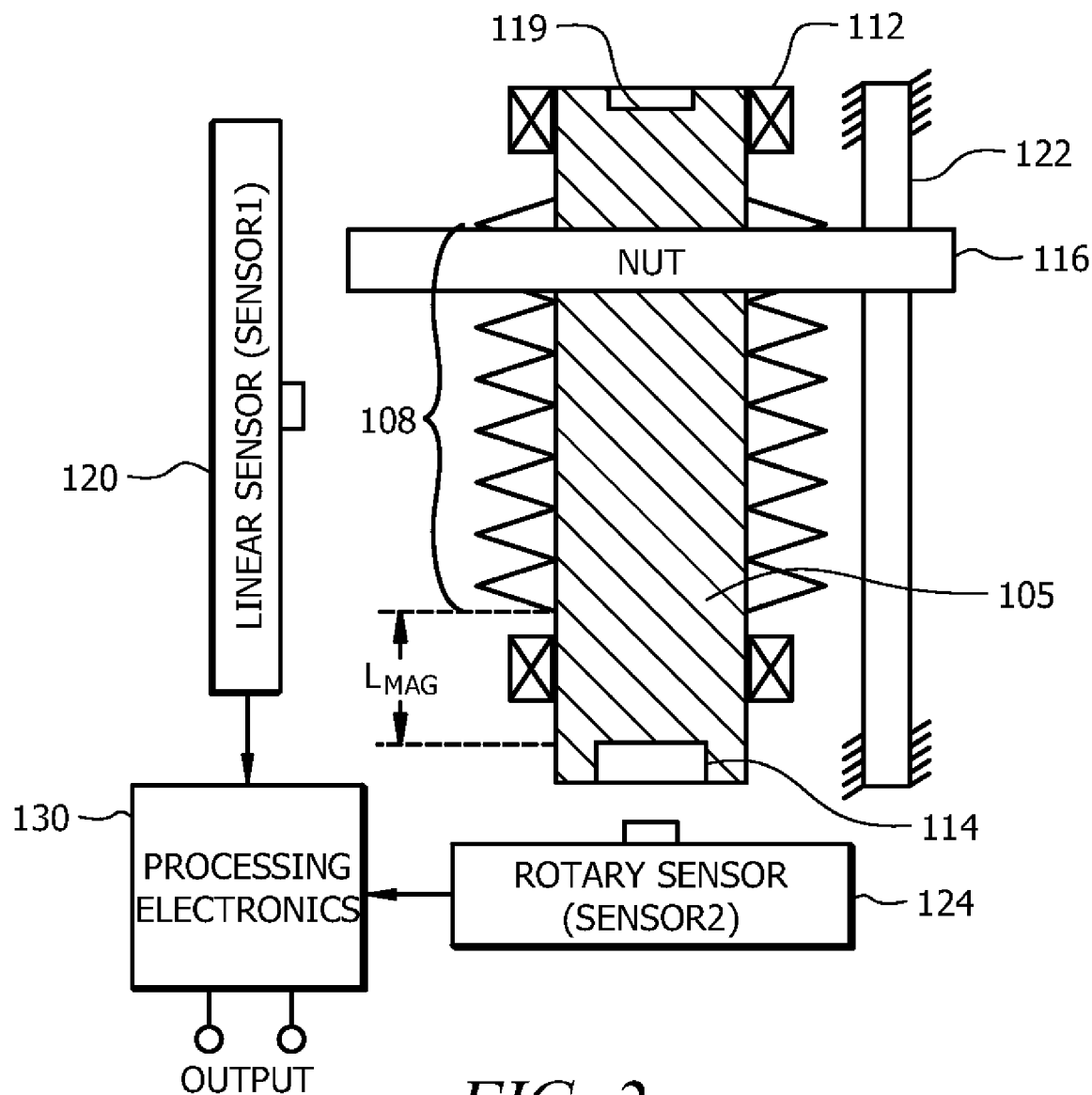
FIG. 2 is a front view depiction of an angular position sensor according to another embodiment of the invention.

FIG. 2 is a front view depiction of an angular position sensor 200 according to another embodiment of the invention. In this embodiment nut 116 and shaft 105 both comprise a magnetic permeable material. As used herein, a "magnetic permeable material" refers to a material that provides a magnetic permeability ($\mu$) of at least 500 $\mu N/A^2$ at 0.002 T and zero frequency. The magnetic permeable material is generally an iron or a ferrous alloy. In this embodiment, nut 116 does not require the permanent magnet 118 shown in FIG. 1A. Accordingly, position sensor 200 only includes a single permanent magnet, first permanent magnet 114. In this embodiment as the magnetically permeable nut 116 moves up and down as shaft 105 rotates the magnetic flux path is altered. This change in magnetic flux is sensed by first magnetic sensor 120. As with angular position sensor 100, the rotational position of the shaft 105 is sensed by second magnetic sensor 124. This single permanent magnet embodiment has the advantage that Lmag can be nearly zero. As a result, the shaft 105 can be reduced in overall size generally resulting in a smaller position sensor and a reduced cost.

Figure 3:
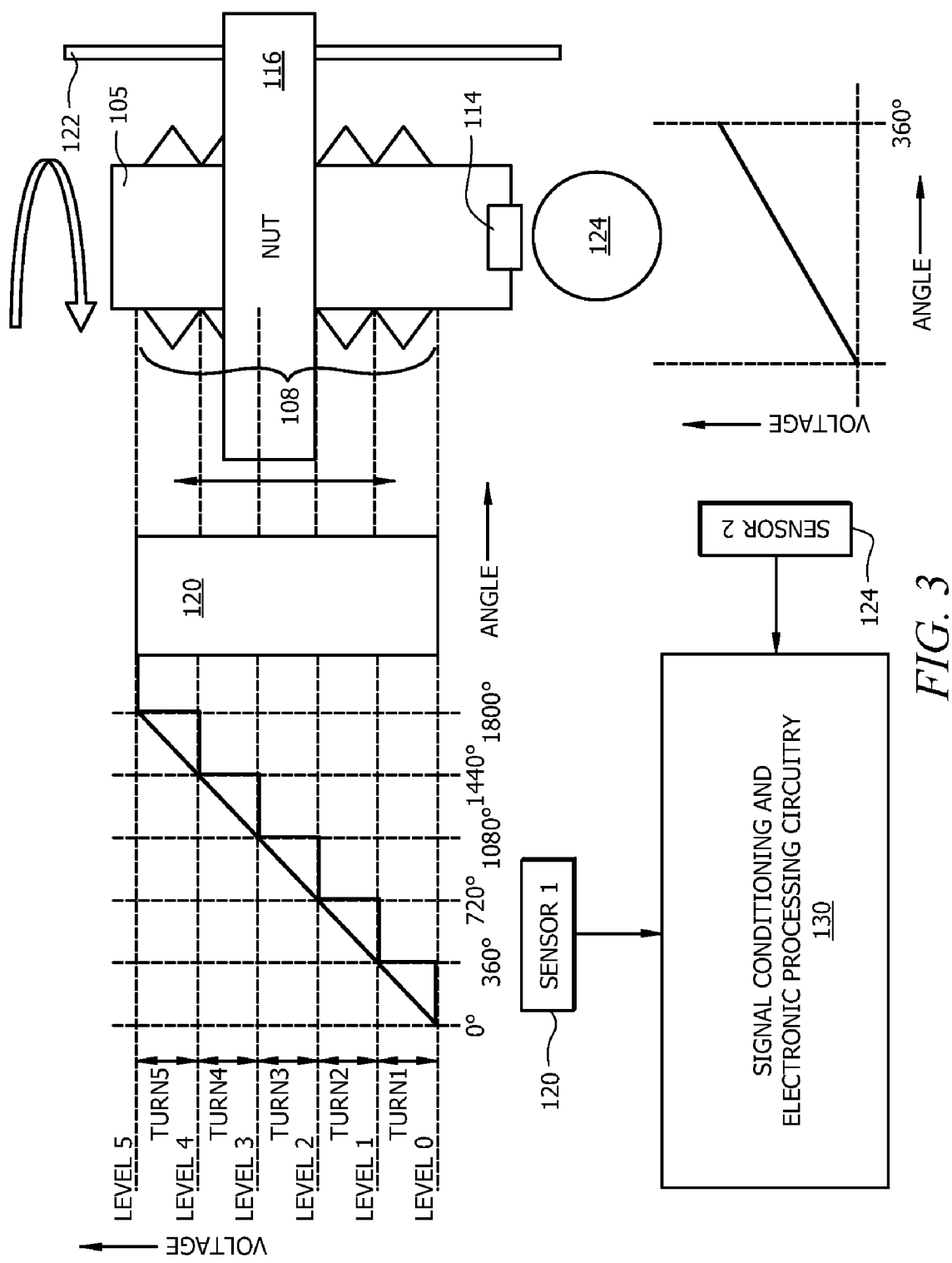
FIG. 3 is a depiction of exemplary sensor data provided by the first magnetic sensor and second magnetic sensor to electronic processing circuitry in the form of course and fine measurements, according to yet another embodiment of the invention.

FIG. 3 is a depiction of exemplary sensor data provided by the first magnetic sensor 120 and second magnetic sensor 124 to electronic processing circuitry 130 in the form of course and fine measurements, respectively. First magnetic sensor 120 which provides the course measurements in the form of the number of full turns is shown providing voltage levels that correspond to linear (vertical) positions of nut 116, with increasing voltage corresponding to increased vertical translation of nut 116. For example, assume the position sensor is configured to measure 1,080 degrees and the operating voltage is 5 volts. 1,080 degrees capability means the position sensor is operable for 3 turns. In this arrangement, the position sensor operating as a linear sensor varies its output voltage 5/3 Volts per turn. At the same time the actual angle in that turn can be calculated by the voltage variation at the second magnetic sensor 124 which will provide an output voltage equal to 5/360*(number of degrees).

Although shown as voltage levels, first magnetic sensor 120 can also output current levels that correspond to linear (vertical) positions of nut 116, and second magnetic sensor 124 can similarly output current levels that correspond to the number of rotational degrees in that turn. As shown in FIG. 3, each pitch increment of threaded portion 108 corresponds to 360 degrees of rotation. The levels 0 to 5 shown in FIG. 3 are the full turn counts which comprise the "coarse reading". Assuming the reading from first magnetic sensor 120 is reasonably accurate, the "coarse reading" provided may be obtained by simply rounding down reading (e.g. 1.35 turns to 1 turn).

The reading between the turns (fractional turn reading) is the "fine reading" and is obtained directly from the output of the second magnetic sensor 124. As described above, for a 5 volt power supply and the full angular range to be measured being 360 volts, then voltage variation in the output of the second magnetic sensor 124 is 5/360=0.0138 Volts/degree. When the shaft 105 is rotated more than one turn the nut 116 will be moved linearly by an amount equal to its pitch, which will be sensed by first magnetic sensor 120. Both the output from the first magnetic sensor 120 and the second magnetic sensor 124 are provided to processing circuitry 130 where the two outputs will processed with a generally simple algorithm to provide a linear output related to the rotary motion of the rotatable member coupled to the angular position sensor for the required sensing range. Thus, the measured position obtained by electronic processing circuitry 130 is sum of the "coarse" and "fine" readings. The processing circuitry 130 can provide the actual angular position in digital or analog format as required. Moreover, the voltage output can be calibrated as per particular requirements.

FIG. 4 shows a block diagram schematic for exemplary signal conditioning and electronic processing circuitry 130. Signal conditioning and electronic processing circuitry 130 is shown receiving as inputs analog outputs (e.g. voltage or current levels) from the first magnetic sensor 120 and the second magnetic sensor 124. These inputs are coupled to an analog multiplexer (AMUX) 132 which includes at least two (2) channels. Although not shown, the connecting wires from first and second magnetic sensors 120 and 124 are generally shielded. The output of AMUX 132 is coupled to signal conditioning (e.g. filtering) and amplify block 134. The signal conditioning and amplifying block 134 can comprise a filter network coupled to a programmable gain amplifier (PGA). The amplified and filtered output provided by signal conditioning and amplify block 134 is coupled to the input of analog to digital converter (ADC) 136 which outputs digital signals. The ADC 136 may be an external ADC or internal to microcontroller block 138. As known in the art, a microcontroller (sometimes referred to as an MCU or µC) is a functional computer system-on-a-chip. The microcontroller includes a processor core, memory, and programmable input/output peripherals. Microcontrollers typically include an integrated CPU, memory (RAM, program memory, or both) and peripherals capable of input and output. As noted above, in some arrangements ADC 136 is included in microcontroller block 138.

The digital conversion provided by ADC 136 can be controlled by the microcontroller 138. As shown in FIG. 4, the digital sensor signals provided by ADC 136 are coupled to microcontroller 138. An output of microcontroller block 138 is shown coupled to the gain select pin of the amplifier in signal conditioning and amplifying block 134 and the channel select pin of AMUX 132. The output of microcontroller block 138 is shown coupled a digital to analog converter (DAC) block, which provides analog outputs such as I2C outputs.

In operation, the AMUX 132 is used to alternatively switch between the output provided by first magnetic sensor 120 and second magnetic sensor 124. The channel selection is generally controlled by microcontroller block 138. The gain of the amplifier in the signal conditioning and amplify block 134 may be adjusted by the control lines shown from the microcontroller block 138. The gain may need to be adjustable because gain requirement for first magnetic sensor 120 and second magnetic sensor 124 may be different if embodied as different sensing element types. For example, when first magnetic sensor 120 is a Hall element and second magnetic sensor 124 an AMR element magnetic sensor 124, the AMR-based sensor will generally need more gain. Also, the variable gain is a useful feature to have to account for gain errors in first and second magnetic sensors 120 and 124. The selected sensor output is amplified to a suitable level using the signal conditioning amplifier 134. The microcontroller block 138 generates the control signals for ADC 136, AMUX 132 & amplifier (e.g. PGA) in signal conditioner and amplifier block 134. The processing of the signals from first and second magnetic sensors 120 and 124 can be performed by the microcontroller block 138. The calibration of the first and second magnetic sensors 120 and 124 may also be accomplished using the microcontroller block 138.

In the case the sensor data from the first and second magnetic sensors 120 and 124 is in digital form the signal conditioning and electronic processing circuitry 130 can be modified accordingly as known in the art by replacing AMUX 132 with a digital MUX, the signal conditioning and amplifying block 134 with digital conditioning and amplifying implementations, thus eliminating the ADC 136. The signal conditioning and processing electronics 130 may also be implemented using discrete IC's. In another embodiment, the signal conditioning & processing electronics can be implemented in one or more application specific integrated circuits (ASICs).

In one embodiment of the invention software run by the microcontroller 138 is used to correct for errors due to offset/wear of nut 116 reflected in readings from first magnetic sensor 120 up to a ½ turn. Correction through ½ a turn is generally sufficient since errors during the lifetime of angular position sensors are generally <<½ turn. Correction for error according to an embodiment of the invention can be accomplished by comparing readings from first magnetic sensor 120 and second magnetic sensor 124 sensor and applying corrections based on algorithms stored in memory associated with microcontroller block 138. The assumption used is in this embodiment is that the readings reported by the second magnetic sensor 124 are more accurate as compared to the readings reported by the first magnetic sensor 120 (e.g. such a case would be when second magnetic sensor 124 is an AMR sensor and first magnetic sensor 120 is a Hall-effect sensor). As described below, when comparing readings from first magnetic sensor 120 and second magnetic sensor 124 for error correction generally only the fractional portion of turn measured by the first magnetic sensor 120 is compared with the reading from the second magnetic sensor 124.

An exemplary error compensating algorithm is provided below. It is assumed that second magnetic sensor 124 has a higher accuracy as compared to first magnetic sensor 120, such as when the second magnetic sensor 124 comprises an AMR element and the first magnetic sensor 120 comprises a Hall element. As described below, second magnetic sensor 124 is used as a reference sensor. In this embodiment, the pitch of the threaded portion 108 is generally >> accuracy of the first magnetic sensor 120. For example, if the pitch of the threaded portion 108 is 2 mm, then the accuracy of the first magnetic sensor 120 will be <2 mm, such as <0.5 mm.

If the worst case error for first magnetic sensor 120 after considering effects such as drifts due to ageing, wear and temperature variations is generally <50% of the pitch of the threaded portion 108, then the exemplary error compensation algorithm described below can generally be used. The exemplary error compensation algorithm reports a corrected coarse reading which represents a compensatable number of compete (full) turns reported by first magnetic sensor 120 and a fine turn reading from the number of fractional turns derived from the reading from the second magnetic sensor 124.

The turn reading reported by the first magnetic sensor 120 generally includes the number of complete turns as well as the fractional number of turns. For example, a reading of 1.35 by the first magnetic sensor 120 represents 1 (one) full turn and 35% of a fractional turn (0.35 turns). Second magnetic sensor 124 reports an angle <360 degrees, which as described below can be converted into a fractional turn count.

Figure 5:
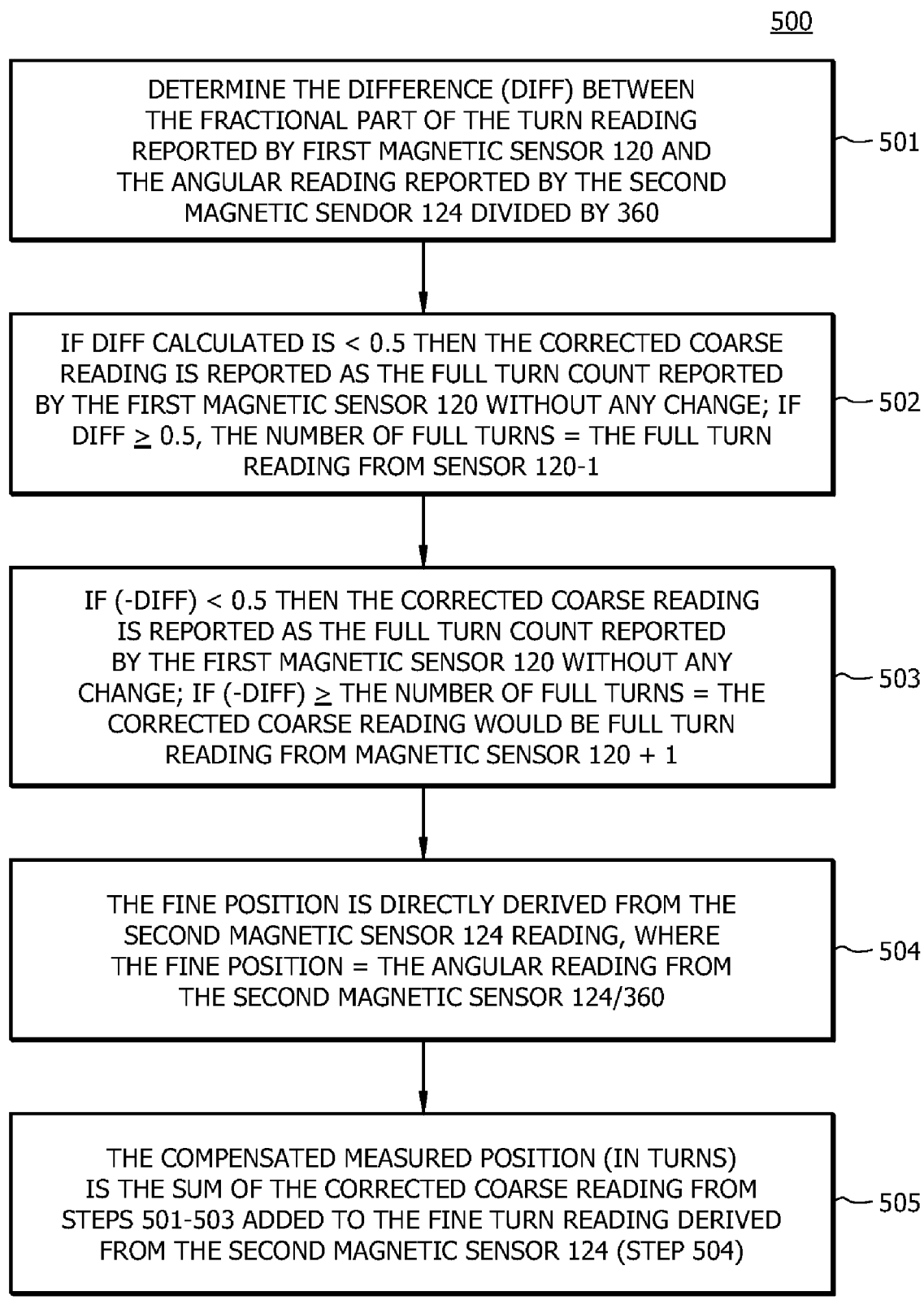
FIG. 5 is a flow chart that describes an exemplary error compensation method according to an embodiment of the invention for reporting error compensated turn counts, such as for compensating for wear and tear.

FIG. 5 is a flow chart that describes an exemplary error compensation method 500 according to an embodiment of the invention for reporting error compensated turn counts, such as for compensating for wear and tear. Step 501 comprises determining the difference (Diff) between the fractional part of the turn reading reported by first magnetic sensor 120 and the angular reading reported by second magnetic sensor 124 divided by 360. Then Diff is calculated as=(angular reading from sensor 124/360)–the turn reading from first magnetic sensor 120 rounded down to the nearest integer ("rounddown (sensor1)").

In step 502 if the Diff calculated is <0.5 then the corrected coarse reading is reported as the full turn count reported by first magnetic sensor 120 without any change. In this case the coarse reading=rounddown(the turn reading from first magnetic the first sensor 120). In the particular case 1.35 is the reading from the first magnetic sensor 120, then the corrected course reading is 1. However, if Diff≧0.5, the number of full turns=the full turn reading from sensor 120–1. In the particular case 1.35 is the reading from the first magnetic sensor 120, the corrected course reading would be 0.

In step 503, if (–Diff)<0.5 then the corrected coarse reading is reported as the full turn count reported by the first magnetic sensor 120 without any change. In the particular case 1.35 is the reading from the first magnetic sensor 120, the course reading would be 1. However, if (–Diff)≧the number of full turns=the corrected coarse reading would be full turn reading from the first magnetic sensor 120+1. In the particular case 1.35 is the reading from the first magnetic sensor 120, the corrected course reading would be 2.

Thus, steps 501-503 provide a corrected coarse position reading that is reported as an integer number of turns. In step 504 the fine position is directly derived from the second magnetic sensor 124 reading, where the fine position=the angular reading from the second magnetic sensor 124/360.

In step 505 the compensated measured position (in turns) is the sum of the corrected coarse reading from steps 501-503 added to the fine turn reading derived from second magnetic sensor 124 (step 504). The compensated measured_position (in turns)=corrected coarse turn reading (in number of turns)+ fine turn reading (in a fractional number of turns).

The above steps can be coded in software run by microcontroller 138 shown in FIG. 4. The above steps can be put in an infinite loop in the microcontroller 138 to ensure that the measured position is always current. The above algorithm is relatively simple and can generally be implemented in a low cost commercially available microcontroller 138. The compensated measured_position (in turns) can simply be converted to an angular measure by multiplying by 360.

Figure 6:
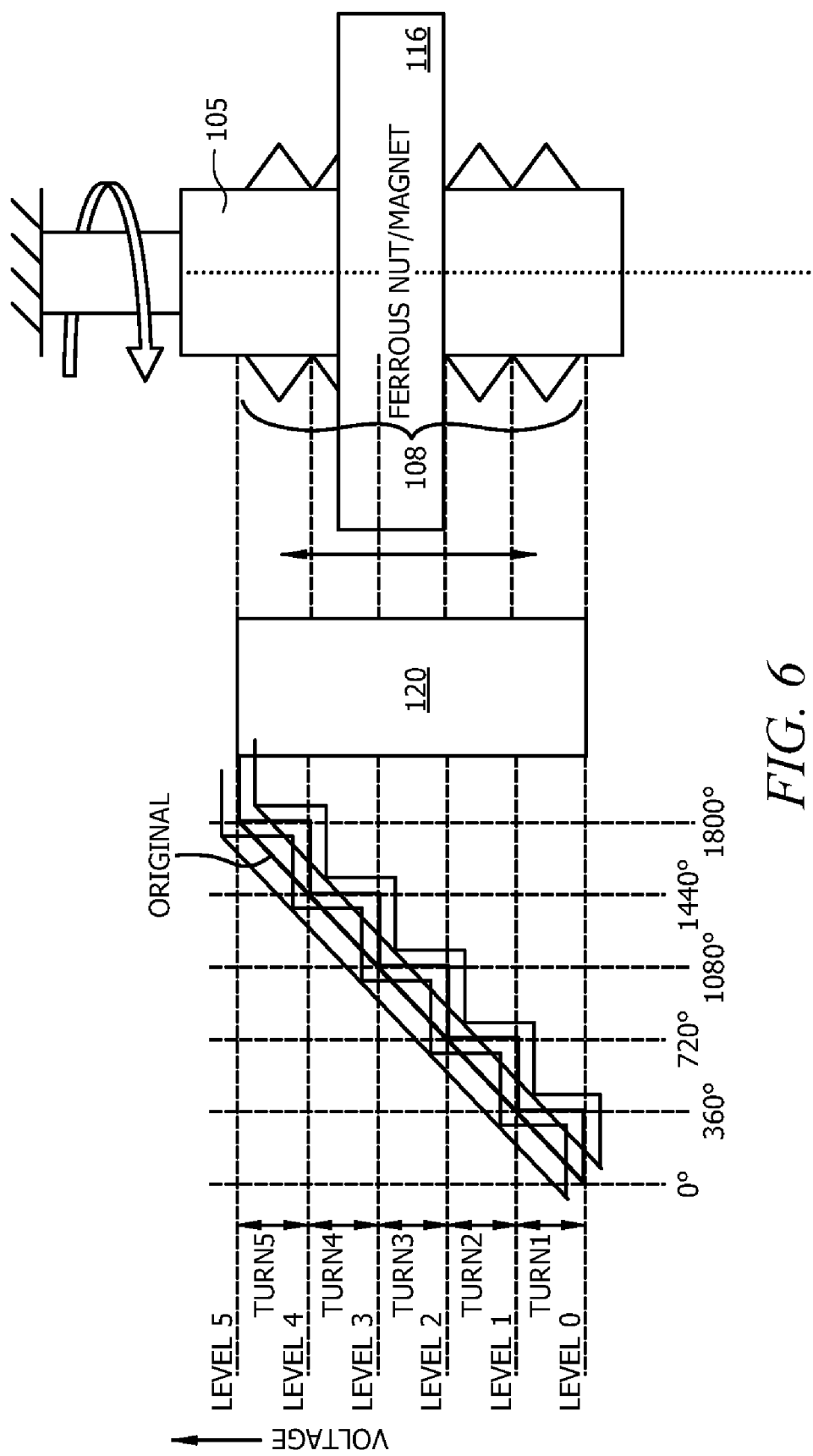
FIG. 6 depicts the effect of wear and tear of the nut, and how embodiments of the invention can be self-compensated for wear and tear as well as for nut-bolt backlash.

FIG. 6 depicts the effect of wear and tear or other drift of the nut 116, and how embodiments of the invention can be self compensated for wear and tear as well for nut-bolt backlash. Three data sets are shown. The data set marked as the "original" is the same data as shown in FIG. 3 which represents the data provided before any wear and tear on nut 116 due to movement on threaded portion 108. There are two other data sets provided in FIG. 6, one shown above the original data and one below the original data. Using a correction algorithm according to an embodiment of the invention, such as the one described above, the data sets both above and below the original data set are error compensated to overlap with the original data set.

Embodiments of the invention provide several significant advantages as compared to known rotary sensing apparatus for sensing angles more than 360 degrees. Known rotary sensing apparatus generally measure the angle only by measuring linear movement of the nut. However, a disadvantage in such a configuration is the voltage variation per degree which results in such arrangements lacking in the accuracy as the angle to be sensed becomes relatively large. For example, to measure an angle over 3 turns (1,080 degrees) with a conventional operating voltage of 5 volts, the voltage variation per degree is only 0.0046 Volts which is generally too small to be accurately measured or differentiated. Hence, the accuracy of such conventional solutions decreases as the angle range increases. Using two separate measurements according to embodiments of the invention, such as the first magnetic sensor 120 embodied as a linear sensor for turn count and the second magnetic sensor 124 embodied as a rotary sensor for angle count substantially overcomes the above-described problems with conventional solutions by providing a measurable voltage for each turn to represent integer multiples of 360 degrees as well as for the fraction of a turn in the form of an angle <360, which is combined to get the actual angle in the particular turn. Embodiments of the invention thus provide the advantage of linear output over the required angular sensing range.

Other advantages include error compensation for wear and tear, and a mechanical memory that does not depend upon electrical power being provided. The multi-turn position sensors described herein display the correct angular position even after the power supply is restored after an interruption. This is because the position of the nut 116 is determined each time using readings from first magnetic sensor 120 and second magnetic sensor 124. For example, if the power goes off and one turn more is completed while the power is off, when power comes back on the position sensor will still able to know by looking at readings from first magnetic sensor 120 what turn (e.g. 0, 1, 2, 3, 4 or 5) the nut 116 is currently in.

That means the memory of the angular position sensor will not depend upon electrical power. Accordingly, the previously computed position of the nut 116 need not be stored in an electronic memory as is conventionally done. Each time the position can be computed afresh. Moreover, as described above position sensors according to embodiments of the invention can be self-compensated for wear and tear as well for nut-bolt backlash. In addition, such sensors can be programmed using microcontroller 138 for a required output. For example, the output can be a I2C, serial or a range such as 4 to 20 mA.

As described above position sensor for sensing angles according to embodiments of the invention can convert rotary motion of an external application into an electrical signal that can be used to provide control data. Such control data can be used for major chassis systems and other automotive, as well as non-automotive applications.

Steering position sensors generally require the angular position sensor to be located at periphery of steering shaft. The Steering wheel angle sensor (SAS) such as position sensor 100 can be used to provide a highly reliable electrical signal to other electronic devices for the purpose of enhanced stability control and other vehicle performance enhancements. The SAS 100 can be mounted to the steering column housing below the clock spring and is in turn actuated by the steering column shaft rotation.

Figure 7A:
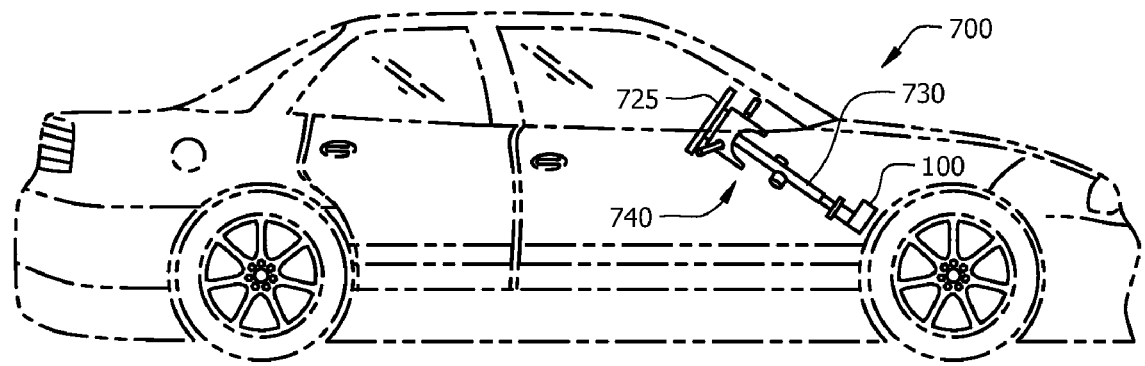
FIG. 7A shows a motor vehicle comprising a steering wheel assembly comprising having a steering wheel coupled to a rotatable steering shaft engaged to a steering position sensor, according to an embodiment of the invention.
Figure 7B:
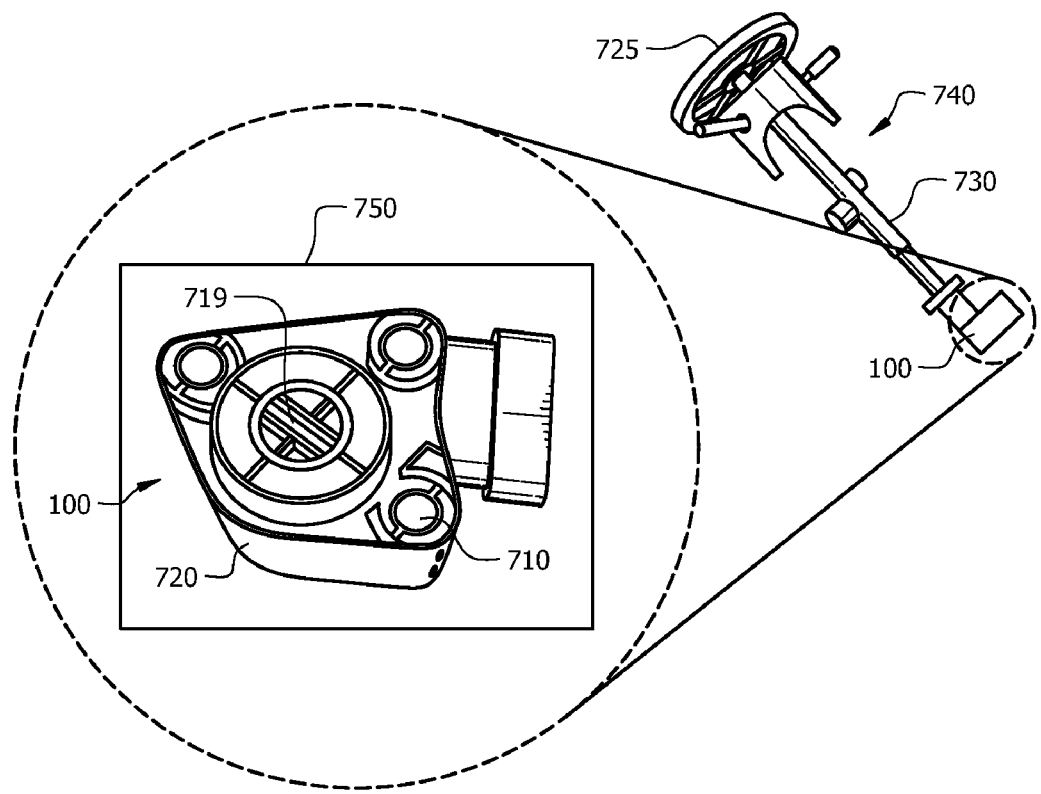
FIG. 7B shows some details of the steering wheel assembly and its engagement to a steering position sensor, according to an embodiment of the invention.

FIG. 7A shows a motor vehicle 700 comprising a steering wheel assembly 740 comprising a steering wheel 725 coupled to a rotatable steering shaft 730 engaged to a steering position sensor 100 according to an embodiment of the invention. FIG. 7B shows some details of the steering wheel assembly 740 and its engagement to steering position sensor 100 as well as the steering position sensor 100 being part of a steer-by-wire and electric assist power steering system 750. Position sensor 100 is shown including a housing 720, such as a plastic housing 720, and mounting holes 710 to mount position sensor 100 to the chassis of motor vehicle 700. Housing 720 will generally have an arrangement to fasten itself on to the chassis and a slot provided on screw end that will be engaged with an external application that has a rotatable member such as the shaft of a steering wheel.

Hydraulic power steering can sap a car's performance creating parasitic power loss and driving down fuel economy as much as five (5) percent. Steer-by-Wire and electric assist power steering systems, such as shown in FIG. 7B, on the other hand, are compact, light, and easy to maintain, making them practical even in vehicles with small engines where performance might rule out hydraulic steering. Accordingly, in the future there will be steer-by-wire applications where steering angle sensors will play central role. However, for this kind of application it is necessary that the sensors are fault tolerant and have memory which will work even though no electrical power is there and steering column is moving. Such a sensor should be able to compensate errors due to wear and tear. Sensors according to embodiments of the invention generally meet all these requirements.

Sensors according to embodiments of the invention can be used for a variety of other applications. Other automotive applications include pedal position, transmission gear selection, and adaptive headlight aiming systems. Non-automotive applications can include marine hand throttle position, inboard/outboard tilt and rotation, agricultural equipment motion and general industrial equipment. Another application is valve sensing. With a gear arrangement sensors according to embodiments of the invention can be deployed to measure the number turns and thereby opening of the valve. There can be different mechanical arrangement adapted to fit sensors according to embodiments of the invention in this application, such as described above. In an exemplary valve application, rotation of the valve is sensed by converting the rotational movement to linear movement for the rotation portion in multiple of 360 degrees as described above.

EXAMPLE

The following non-limiting Example serves to illustrate selected embodiments of the invention. It will be appreciated that variations in proportions and alternatives in elements of the components shown will be apparent to those skilled in the art and are within the scope of embodiments of the present invention.

Assume the pitch of the threaded portion 108 (e.g. screw) =1 mm. Accordingly, the nut 116 will move 1 mm up or down depending on the direction of rotation of shaft 105 per rotation of shaft 105. Assume the reading from first magnetic sensor 120 is calculated to correspond to 1.5 mm. This means nut 116 is in the second turn. Assume the reading from the second magnetic sensor 124=180°. The actual angle output from electronics processing circuitry 130 would then equal the fractional turn reading from second magnetic sensor 124 added to 360×(the integer turn count from first magnetic sensor 120−1)=180+360*(2−1)=540°.

While various embodiments of the present invention have been described above, it should be understood that they have been presented by way of example only, and not limitation. Numerous changes to the disclosed embodiments can be made in accordance with the disclosure herein without departing from the spirit or scope of the invention. For example, rather than permanent magnets, it is possible to use electromagnets. Electromagnets will generally be more difficult in typical applications as there are moving parts, and power needs to be supplied to the electromagnet. In one embodiment the electromagnet comprises a self powered electromagnet. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. An angular position sensor, comprising:
a shaft having a threaded portion, and a structure for engaging an external application that involves rotation of a rotatable member, said rotation of said rotatable member rotating said shaft, wherein said shaft includes a first permanent magnet;
a nut having threading threaded on said threaded portion; wherein said nut is formed from a first magnetic permeable material or comprises a second permanent magnet;
at least one constraint coupled to said nut for preventing rotational movement of said nut while allowing linear motion of said nut;
a first magnetic sensor positioned along a length of said threaded portion of said nut for measuring a linear position of said nut;
a second magnetic sensor for measuring an angular position of said shaft, and signal processing circuitry coupled to receive respective outputs from said first magnetic sensor and said second magnetic sensor for calculating a parameter relating to an angular position of said rotatable member, wherein said parameter comprises a turn count, and wherein said microcontroller derives a course measured position portion comprising an integer number of turns of said turn count from said linear position of said nut provided by said first magnetic sensor and a fine measured position portion fractional portion of said turn count from said angular position of said shaft from said second magnetic sensor.

2. The angular position sensor of claim 1, wherein said first permanent magnet is aligned to have its respective poles oriented along an axial direction of said shaft.

3. The angular position sensor of claim 1, wherein said second magnetic sensor is positioned along an axial direction of said shaft.

4. The angular position sensor of claim 1, wherein said signal processing circuitry includes a microcontroller.

5. The angular position sensor of claim 4, wherein said second magnetic sensor has a higher accuracy as compared to said first magnetic sensor, further wherein said microcontroller includes stored software for error compensation which uses said second magnetic sensor as a reference sensor to correct error for said first magnetic sensor.

6. The angular position sensor of claim 1, wherein said signal processing circuitry comprises in a serial connection an analog multiplexer (AMUX) having at least two channels, a signal conditioning amplifier block, and analog to digital converter (ADC), and a microcontroller, wherein said microcontroller is coupled to said signal conditioning amplifier block to set a gain for said signal conditioning amplifier block, and said AMUX for channel selection.

7. The angular position sensor of claim 6, further comprising a digital to analog converter (DAC) coupled to an output of said microcontroller.

8. The angular position sensor of claim 1, wherein said nut comprises said second permanent magnet.

9. The angular position sensor of claim 1, wherein at least a portion of said shaft comprises a second magnetic permeable material.

10. The angular position sensor of claim 1, wherein said first magnetic sensor comprises a Hall sensor and said second magnetic sensor comprises an anisotropic magnetoresistive (AMR) sensor.

11. A motor vehicle, comprising:
a steering wheel assembly comprising a steering wheel coupled to a rotatable steering shaft engaged to a steering position sensor, wherein said steering position sensor comprises:
a shaft having a threaded portion, and a structure engaged to said rotatable steering shaft, said rotation of said rotatable steering shaft rotating said shaft, wherein said shaft includes a first permanent magnet;
a nut having threading threaded on said threaded portion; wherein said nut is formed from a first magnetic permeable material or comprises a second permanent magnet;
at least one constraint coupled to said nut for preventing rotational movement of said nut while allowing linear motion of said nut;
a first magnetic sensor positioned along a length of said threaded portion of said nut for measuring a linear position of said nut;
a second magnetic sensor for measuring an angular position of said shaft, and signal processing circuitry coupled to receive respective outputs from said first magnetic sensor and said second magnetic sensor for calculating a parameter relating to an angular position of said rotatable steering shaft, wherein said parameter comprises a turn count, and wherein said microcontroller derives a course measured position portion comprising an integer number of turns of said turn count from said linear position of said nut provided by said first magnetic sensor and a fine measured position portion fractional portion of said turn count from said angular position of said shaft from said second magnetic sensor.

12. The motor vehicle of claim 11, wherein said signal processing circuitry includes a microcontroller.

13. The motor vehicle of claim 12, wherein said second magnetic sensor has a higher accuracy as compared to said first magnetic sensor, further wherein said microcontroller includes stored software for error compensation which uses said second magnetic sensor as a reference sensor to correct error for said first magnetic sensor.

14. The motor vehicle of claim 13, wherein said first magnetic sensor comprises a Hall sensor and said second magnetic sensor comprises an anisotropic magnetoresistive (AMR) sensor.

15. The motor vehicle of claim 11, further comprising a steer-by-wire and electric assist power steering system, wherein said steering position sensor is a component of said steer-by-wire and electric assist power steering system.

* * * * *